(12) United States Patent
Sollie et al.

(10) Patent No.: US 11,478,085 B2
(45) Date of Patent: Oct. 25, 2022

(54) LOCKING DEVICE FOR A CHAIR

(71) Applicant: Flokk AB, Nässjö (SE)

(72) Inventors: Marius Sollie, Oslo (NO); Gaute Hovdal, Jar (NO); Kristian Greger Leinan, Oslo (NO); Morten Kildahl, Oslo (NO)

(73) Assignee: Flokk AB, Nässjö (SE)

( * ) Notice: Subject to any disclaimer, the term of this patent is extended or adjusted under 35 U.S.C. 154(b) by 0 days.

(21) Appl. No.: 17/286,408

(22) PCT Filed: Oct. 19, 2018

(86) PCT No.: PCT/EP2018/078760
§ 371 (c)(1),
(2) Date: Apr. 16, 2021

(87) PCT Pub. No.: WO2020/078569
PCT Pub. Date: Apr. 23, 2020

(65) Prior Publication Data
US 2021/0345782 A1 Nov. 11, 2021

(51) Int. Cl.
*A47C 3/023* (2006.01)
*A47C 7/54* (2006.01)
*F16B 7/14* (2006.01)

(52) U.S. Cl.
CPC ............ *A47C 7/541* (2018.08); *F16B 7/1454* (2013.01)

(58) Field of Classification Search
CPC ................................. A47C 1/0307; A47C 1/03
See application file for complete search history.

(56) References Cited

U.S. PATENT DOCUMENTS

| 9,795,220 | B1 * | 10/2017 | Chen | ........................ | A47C 1/03 |
| 10,772,434 | B2 * | 9/2020 | Susie | ..................... | A47C 7/546 |
| 2011/0140498 | A1 | 6/2011 | Tsai | | |

(Continued)

FOREIGN PATENT DOCUMENTS

| DE | 102009019232 A1 * | 11/2009 | ........... A47C 1/0307 |
| WO | 2016106169 | 6/2016 | |

OTHER PUBLICATIONS

PCT/EP2018/078760; International Search Report and Written Opinion; dated May 15, 2019; 12 pages.

(Continued)

*Primary Examiner* — Sarah B McPartlin
(74) *Attorney, Agent, or Firm* — Kilpatrick Townsend & Stockton LLP

(57) ABSTRACT

A locking device for an armrest pole. The locking device comprises a housing element configured for slidably accommodating the armrest pole. A locking handle comprises an abutment end, the locking handle is rotatably connected to the housing element and configured for rotation between a locked position where the armrest pole is fixed in the locking device and an unlocked position where the armrest pole is slidable in the locking device. The locking device also comprises a wedge element comprising a wedge and an abutment portion, the abutment portion configured for being directly or indirectly biased by the abutment end, the wedge configured and arranged for at least partly insertion between a portion of the armrest pole and at least a portion of the housing element in the locked position.

7 Claims, 2 Drawing Sheets

(56) References Cited

U.S. PATENT DOCUMENTS

2017/0027329 A1   2/2017   Su
2018/0020836 A1   1/2018   Schroeder

OTHER PUBLICATIONS

PCT/EP2018/078760; Written Opinion; dated Aug. 31, 2020; 5 pages.
PCT/EP2018/078760; International Preliminary Report on Patentability; dated Mar. 15, 2021; 5 pages.
Application No. SE2150547-4, Office Action, dated Nov. 25, 2021, 7 pages.

* cited by examiner

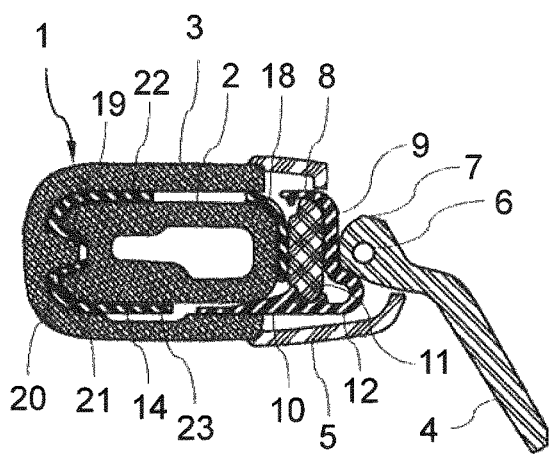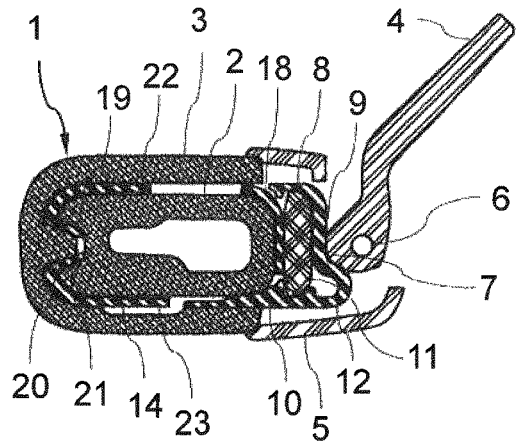
Fig. 2a　　Fig. 2b
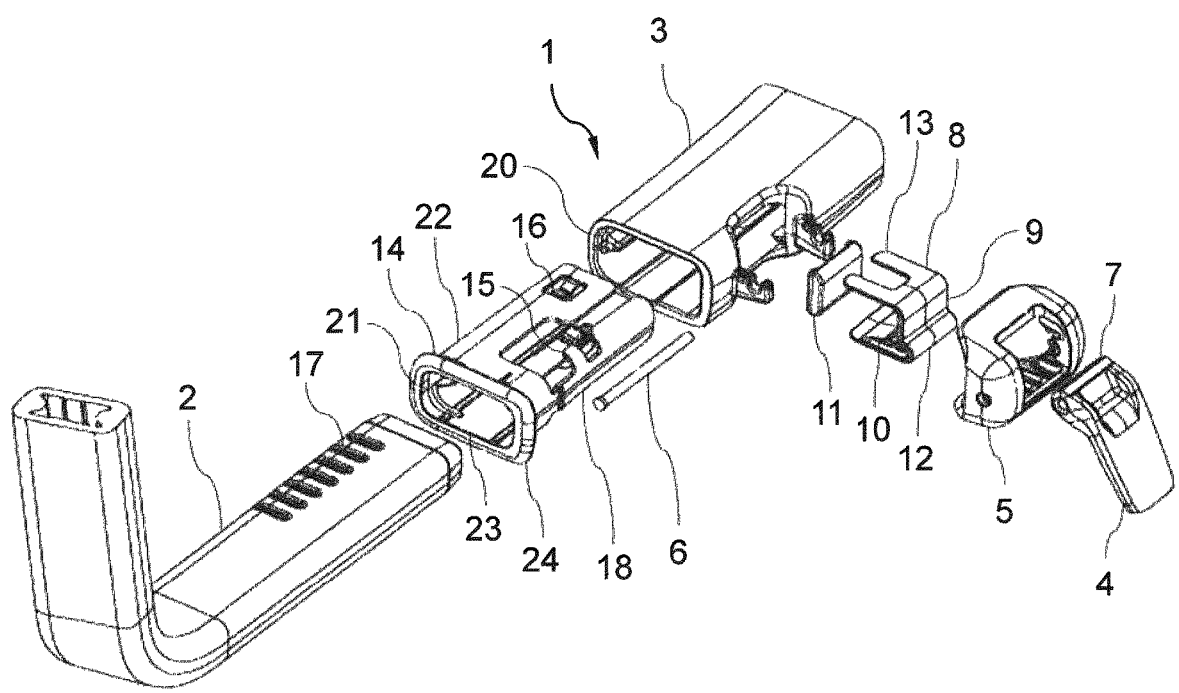
Fig. 3

LOCKING DEVICE FOR A CHAIR

The invention relates to a locking device, and more specifically to a locking device comprising a handle for locking an armrest pole.

BACKGROUND

Many chairs are adjustable in a number of ways, this is especially true for office chairs. Office chairs may comprise armrests, and the armrests might be adjustable in both the height, length and sideways direction of a chair. When adjusting the armrests in a sideways direction, the armrests are adjusted in a direction away from, or towards, the chair seat. The armrests are adjustable in a sideways direction in order to adjust the chair to users with different shoulder width or hip width, and to users with different preferences regarding positioning the arms close to the body or not when resting the elbows on the armrests.

Armrests that allow sideways adjustment may be connected to an armrest pole that is connected to the chair on the underside of the chair seat. The connection might be a locking device, which can lock and unlock the armrest pole at different positions. However, a common problem related to adjustable armrests is that even a small allowed movement of the armrest pole in the locking device results in a much larger movement of the actual armrest itself, the armrest being mounted at the end of the armrest pole. An armrest that is not rigid but can be moved slightly when it is locked in place is unfavorable as it is perceived as being of poor quality. A loose armrest may ruin the appearance of the chair as a whole, no matter how rugged and well built it is otherwise.

Among others, manufacturing inaccuracy and tolerances between parts could lead to the armrest pole being allowed to move slightly inside a locking device on an underside of the chair. When an armrest is adjustable in a sideways direction, the armrest pole must be allowed to travel while in an unlocked position, and should be completely locked in place when it is in a locked position. But because of production tolerances there is a significant risk of some amount of movement even in a locked position.

There is therefore a need for an improved locking device to reduce or eliminate the above mentioned disadvantages of known techniques. It is an objective of the present invention to achieve this and to provide further advantages over the state of the art.

SUMMARY

In an embodiment, there is provided a locking device for an armrest pole, comprising; a housing element configured for slidably accommodating the armrest pole; a locking handle comprising an abutment end, the locking handle is rotatably connected to the housing element and configured for rotation between a locked position where the armrest pole is fixed in the locking device and an unlocked position where the armrest pole is slidable in the locking device; a wedge element comprising a wedge and an abutment portion, the abutment portion configured for being directly or indirectly biased by the abutment end, the wedge configured and arranged for at least partly insertion between a portion of the armrest pole and at least a portion of the housing element in the locked position.

According to another embodiment of the invention the locking device further comprises a spring element positioned between the locking handle and the armrest pole.

According to another embodiment of the invention the wedge element further comprises a flexible portion connecting the abutment portion and the wedge, for allowing the wedge to move relative to the abutment portion.

According to another embodiment of the invention the wedge element comprises the spring element.

According to another embodiment of the invention the spring element is positioned between the wedge element and the armrest pole.

According to another embodiment of the invention the locking device further comprises a bushing arranged between the housing element and the armrest pole.

According to another embodiment of the invention the bushing comprises a tongue positioned between the wedge element and the armrest pole.

According to another embodiment of the invention the wedge element comprises a guiding element configured for movement in between the armrest pole and the housing element.

According to another embodiment of the invention the guiding element is configured for interaction with a protrusion on the bushing.

BRIEF DESCRIPTION OF THE DRAWINGS

The above and other characteristics will become clear from the following description of embodiments, given as non-restrictive examples, with reference to the attached schematic figures.

FIG. 2a is a section view through the center of an embodiment of an armrest pole and a locking device in an unlocked position.

FIG. 2b is a section view through the center of an embodiment of an armrest pole and a locking device in a locked position.

FIG. 3 is an exploded view illustrating the different parts of an embodiment of a locking device and an armrest pole.

DETAILED DESCRIPTION

The following description may use terms such as "horizontal", "vertical", "lateral", "back and forth", "up and down", "upper", "lower", "inner", "outer", "forward", "rear", etc. These terms generally refer to the views and orientations as shown in the figures and that are associated with a normal use of the invention. The terms are used for the reader's convenience only and shall not be limiting.

Figure 1A:
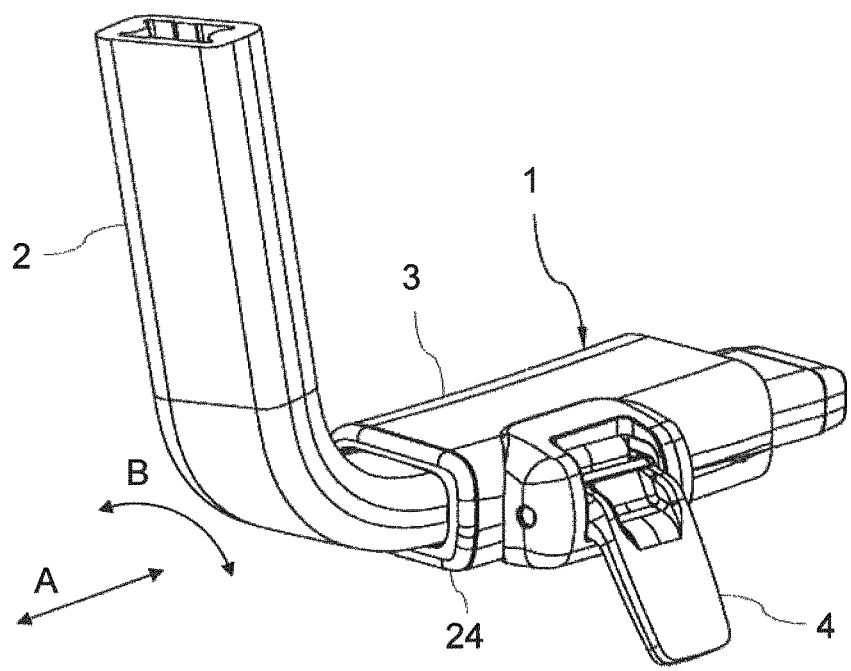
FIG. 1a is a perspective view of an embodiment of an armrest pole and a locking device in an unlocked position.
Figure 1B:
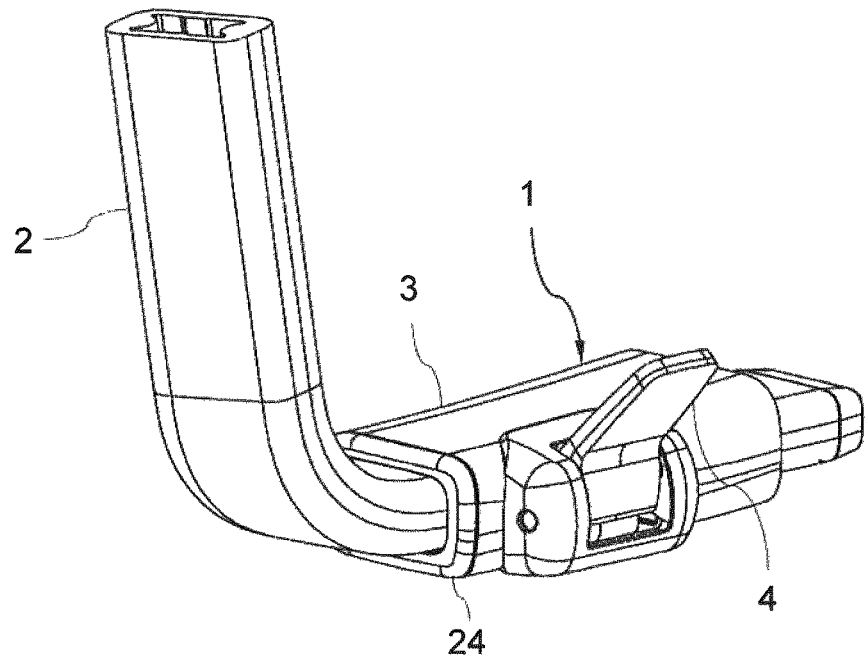
FIG. 1b is a perspective view of an embodiment of an armrest pole and a locking device in a locked position.

Referring initially to FIGS. 1a and 1b, an embodiment of a locking device 1 according to the invention is illustrated together with an armrest pole 2. The armrest pole 2 typically extends a distance on the underside of a chair, illustrated by the horizontal portion of the armrest pole 2 in FIGS. 1a and 1b. In FIGS. 1a and 1b, the upper part of the armrest pole 2 is cut for illustration purposes, but the armrest pole 2 extends upwards and normally supports an armrest (not shown). The actual armrest would as such be located somewhere above the upright portion of the armrest pole 2 in FIGS. 1a and 1b. The armrest pole 2 may also be a backrest pole, or any other adjustable pole on an adjustable furniture, as a skilled person would appreciate.

In an unlocked position of the locking device 1, as illustrated in FIG. 1a, a locking handle 4 may be pointing in a direction, e.g. downwards. In the unlocked position, the armrest pole 2 can be adjusted sideways, i.e. in a direction indicated by arrow A in FIG. 1*a*. If the armrest pole 2 is moved to the left in the direction of the arrow A in FIG. 1*a*, the distance from the armrest to the chair increases. Arrow B indicates a direction of rotation that is especially critical when locking the armrest pole 2 to the chair. The rotation indicated by arrow B is about a longitudinal axis of a horizontal portion of the armrest pole 2, i.e. about the arrow A. The rotation indicated by arrow B could be about multiple axes, and it is not necessarily about a specific axis; the rotational movement B depends on which tolerances in the locking device 1 allow the armrest pole 2 to move. A small movement of the armrest pole 2 inside the locking device 1 nevertheless results in a much greater movement of the armrest itself. The design of the armrest pole 2 will also affect the degree to which it is able to rotate in the direction indicated by arrow B. A rectangular-shaped cross section of the armrest pole 2 as indicated in the figures is advantageous, however, not enough to prevent any rotational movement of the armrest pole 2 inside the locking device 1.

In order to activate the locking device 1 and securely fix the armrest pole 2, a user may rotate the locking handle 4, e.g. in a direction upwards, to a locked position as illustrated in FIG. 1*b*.

The locking device 1 is a part of a chair, and the locking device 1 may be attached to, or form part of, e.g. an underside of a chair. The locking device 1 comprises a housing element 3 which the armrest pole 2 extends into, and the armrest pole 2 may also extend through the housing element 3. The housing element 3 extends a distance in the longitudinal direction of the armrest pole 2, and the longer the housing element 3 extends along the horizontal portion of the armrest pole 2, the more support the housing element 3 could provide to the armrest pole 2. The housing element 3 may even extend across the width of a chair and form part of two locking devices for two armrest poles located on either side of the chair. The housing element 3 may also be part of a frame or seat of a chair, or it could be attached to any such parts. The locking device 1 is advantageously fixed rigidly to a chair, such that when the armrest pole 2 is rigidly fixed to the locking device 1, the armrest pole 2 is prevented from moving and rotating relative to the chair.

Referring now to FIGS. 2*a*, 2*b* and 3, an embodiment of the locking device 1 according to the invention will be further described. FIGS. 2*a* and 2*b* illustrate a cross section of the locking device 1 through the center of the locking handle 4, seen in the longitudinal direction of the horizontal portion of the armrest pole 2. FIG. 3 shows the armrest pole 2 and the different parts of the locking device 1, illustrated in an exploded view.

The locking handle 4 is rotatably connected to a support element 5. The support element 5 may be an integrated part of the housing element 4, or it may be a separate part, as illustrated with reference to this embodiment. The support element 5 supports a hinge pin 6, and may also support the locking handle 4, such that the locking handle 4 is free to rotate about the hinge pin 6. The support element 5 may also limit the rotation of the locking handle 4, such that the support element 5 prevents further rotation of the locking handle 4 when the locking handle 4 has been rotated towards and is in the unlocked position as illustrated in FIG. 2*a*, and similarly limits further rotation of the locking handle 4 when the locking handle 4 is rotated towards and has reached the optimal locked position as illustrated in FIG. 2*b*. The locking handle 4 may also be rotatably connected to the housing element 3 and/or the support element 5 without a dedicated hinge pin, as a skilled person will appreciate.

The locking handle 4 may comprise an abutment end 7. The abutment end 7 may be a protrusion on the locking handle 4, preferably located near the rotation axis (hinge pin 6) of the locking handle 4. The locking handle 4 is thus an eccentric locking handle. When the locking handle 4 is in the locked position, the abutment end 7 is pointing towards the armrest pole 2, and thus creates a bias towards the armrest pole 2 as a distance from the abutment end 7 to the armrest pole 2 is shorter in the locked position than a distance from the abutment end 7 to the armrest pole 2 in the unlocked position. The locking device 1 thus biases the armrest pole 2 and restrains it from movement relative to the housing element 3 in the locked position.

As the locking handle 4 is rotated towards the unlocked position, the abutment end 7 is rotated in a direction away from the direction of the armrest pole 2, and thus the bias towards the armrest pole 2 is relieved. As the abutment end 7 is positioned at a radius closer to the rotation axis than the tip of the locking handle 4 a leverage is created making is easy for a user to move the locking handle 4 from a locked position to an unlocked position and vice versa. This principle of eccentric locking is known and found in many applications.

The locking device 1 further comprises a wedge element 8. The wedge element 8 comprises an abutment portion 9 and a wedge 10. The abutment portion 9 of the wedge element 8 is a surface or other part of the wedge element 8 configured for transferring the bias from the abutment end 7 of the locking handle 4 towards the armrest pole 2. The abutment portion 9 may thus be directly or indirectly biased by the abutment end 7. When the locking handle 4 in the illustrated embodiment is rotated towards the locked position, the abutment end 7 abuts the abutment portion 9, and the wedge element 8 is forced towards the armrest pole 2. As the wedge element 8 is forced towards the armrest pole 2, the wedge 10 is forced in between at least a portion of the housing element 3 and at least a portion of the armrest pole 2. In the illustrated embodiment, the wedge 10 is positioned and inserted on an underside of the armrest pole 2, but it could be inserted on any side of the armrest pole 2.

The wedge 10 is thin where it enters the space between the housing element 3 and the armrest pole 2 (i.e. it has a thickness which is equal to or less than a distance between the housing element 3 and the armrest pole 2), but as the wedge 10 increases in thickness the armrest pole 2 is forced to be securely locked in the locking device 1 when the wedge 10 is pressed further in. In the locked position, the wedge element 8 biases the armrest pole 2 both horizontally, i.e. the abutment portion 9 biases to the left in FIGS. 2*a* and 2*b*, and vertically, i.e. the wedge 10 biases upwards in FIGS. 2*a* and 2*b*. This enables a very efficient locking of the armrest pole 2 in the locking device 1, even if there are large production tolerances.

The wedge element 8 may further comprise a spring element 11. The spring element 11 is in the illustrated embodiment positioned such that the abutment end 7 of the locking handle 4 abuts the abutment portion 9 of the wedge element 8. This provides for an even pressure on the spring element 11, which results in an even pressure being biased in the direction of the armrest pole 2. Alternatively, the spring element 11 could be positioned such that the abutment end 7 abuts the spring element 11 directly, and thus the spring element 11 would be positioned between the abutment portion 9 of the wedge element 8 and abutment end 7 of the locking handle 4. The abutment portion 9 could also be positioned inside or be a part of a spring element 11.

The spring element 11 is compressed as the abutment end 7 of the locking handle 4 is rotated towards the locked position, and the abutment portion 9 of the wedge element 8 is biased towards the armrest pole 2. The spring element 11 may be any element capable of compressing and expanding, and may as such be a rubber pad, a steel spring, a piece of elastic material, and so on. The spring element 11 allows the locking handle 4 to be rotated to the locked position and provides for the locking; if all the parts were rigid, and there were no slack in the locking device 1 or the armrest pole 2, the abutment end 7 of the locking handle 4 might either be impossible to rotate into the locked position, or the locking handle 4 would not be securely fixed in the locked position. When in the locked position, the spring effect of the spring element 11 also helps bias the armrest pole 2, and as such strengthens the biasing effect from the locking handle 4 to the armrest device 2. The spring element 11 is in the illustrated embodiment a rubber insert in the wedge element 8, positioned on the armrest pole-side of the wedge element 8, such that the abutment end 7 is not in physical contact with the spring element 11. As mentioned, the spring element 11 could be positioned anywhere between the locking handle 4 and the armrest pole 2, and may even be a compressible portion of the wedge element 8 or the locking handle 4.

The wedge element 8 may further comprise a flexible portion 12. The flexible portion 12 enables the wedge 10 to flex and move relative to the abutment portion 9. The flexible portion 12 is advantageous if the friction between the armrest pole 2 and housing element 3 is too high for the wedge 10 to be inserted further, i.e. the distance between the armrest pole 2 and housing element 3 where the wedge 10 is inserted has reached its maximum but the locking handle 4 is not yet in its fully locked position, or the spring element 11 is able to be compressed a little more. Because of the flexible portion 12, the abutment portion 9 can be moved a distance further towards the armrest pole 2, and further compress the spring element 11, even if the wedge 10 is wedged and stationary.

The flexible portion 12 is in the illustrated embodiment a curved or undulating portion between the abutment portion 9 and the wedge 10, but may be any kind of element that allows the wedge 10 to move independently of the abutment portion 9.

The wedge element 8 may further comprise one or more guiding elements 13, only visible in FIG. 3. The guiding elements 13 are in the illustrated embodiment two protrusions configured for insertion between the armrest pole 2 and the housing element 3. The guiding elements 13 may even comprise a wedge, but the main function is to guide the wedge element 8 such that the abutment portion 9 and spring element 11 is parallel with the side of the armrest pole 2. In a preferred embodiment, the thickness of the guiding elements 13 is thinner than the thickness of a bushing 14, such that the guiding elements 13 do not interfere with the locking function of the locking device 1. In the illustrated embodiment, the guiding elements 13 interact with a corresponding protrusion 15 (visible only in FIG. 3) on the bushing 14. The interaction between the protrusion 15 on the bushing 14 and guiding elements 13 on the wedge element 8 thus keep the wedge element 8 optimally oriented relative to the armrest pole 2 and locking handle 4.

As mentioned in the previous section, the housing element 3 may comprise a bushing 14. The armrest pole 2 is as such housed in the bushing 14 and the housing element 3. The bushing 14, or a portion of the bushing 14, may extend around the circumference of the armrest pole 2. The bushing 14 may be pressed into the housing element 3, and once in place, form part of the housing element 3.

The bushing 14 is an element that is preferably made in a softer material than the material of the housing element 3 and the armrest pole 2. The armrest pole 2 and housing element 3 may be made of metal, and preferably steel or aluminium. The bushing 14 may be made from a plastic material, which allows for a smoother glide of the armrest pole 2 in the housing element 3.

The bushing 14 may comprise features such as a regulation indicator 16 (visible only in FIG. 3), i.e. a protrusion on the bushing 14 which interacts with and is biased into corresponding grooves 17 (visible only in FIG. 3) on the armrest pole 2. This interaction results in a "clicking" feedback, which can be both heard and felt by a user, and may indicate to the user how many "clicks" (i.e. the distance) the armrest pole 2 has been adjusted in or out of the locking device 1.

The bushing 14 may further comprise a tongue 18 (visible only in FIG. 3). The tongue 18 may be a partly cut-out element of the bushing 14, connected to the bushing 14 at one side. The tongue 18 is an element that can flex independently of the bushing 14. The tongue 18 is configured to be positioned between the wedge element 8 and the armrest pole 2, and may be made from a non-stick material, i.e. a material that decreases the friction to the armrest pole 2, such as a plastic material. The tongue 18 eliminates the chances of the wedge element 8, and the spring element 11 in particular, sticking to the armrest pole 2 as the locking device 1 is unlocked. If the spring element 11 is made from e.g. rubber, and the locking device 1 has been in the locked position for months or even years, there is a chance the spring element 11 can stick to the armrest pole 2, even when the locking device 1 is unlocked. The tongue 18 prevents this. As the tongue 18 can flex independently of the bushing 14, the bushing 14 does not interrupt the bias from the wedge element 8 to the armrest pole 2, and the force exerted on the armrest pole 2 is unaffected by the tongue 18.

The armrest pole 2 may comprise a longitudinal groove 19 (visible only in FIGS. 2a and 2b), which accommodates a corresponding ridge 20 on the inside of the housing element 3. The bushing 14 may also be accommodated between the groove 19 and ridge 20. The groove 19 and ridge 20 create one or more axes of rotation, as the wedge 10 is forced in between the armrest pole 2 and the housing element 3 and forces the armrest pole 2 upwards, while the abutment portion 9 forces the armrest pole 2 to the left in FIGS. 2a and 2b. In the locked position, the armrest pole 2 is thus wedged between the wedge element 8, the ridge 20, and surrounding portions of the housing element 3. Such fixing of the armrest pole 2 provides for a very tight locked position.

In the illustrated embodiment, the bushing 14 is split between an upper portion 22 and a lower portion 23, such that two flanges 21 of the bushing 14 extend along an upper and lower part of the groove 19 and ridge 20, respectively. The upper portion 22 and lower portion 23 may be flexible relative to each other and connected at a bushing end 24 (visible in FIGS. 1a, 1b and 3). The upper portion 22 and lower portion 23 being able to flex relative to each other can contribute to the armrest pole 2 being even more securely wedged in the locking device 1, as a split bushing 14 will not counteract a bias on the armrest pole 2 from several circumferential directions. It should be understood, however, that the bushing may comprise a continuous body, without the splits described above.

While the invention has been described with reference to the embodiment(s) mentioned above, it is to be understood that modifications and variations can be made without departing from the scope of the present invention, and such modifications and variations shall remain within the field and scope of the invention.

The invention claimed is:

1. A locking device for an armrest pole, comprising;
a housing element configured for slidably accommodating the armrest pole, the housing element comprising a support element;
a locking handle comprising an abutment end, the locking handle is rotatably connected to the housing element via the support element and is configured for rotation between a locked position where the armrest pole is fixed in the locking device and an unlocked position where the armrest pole is slidable in the locking device; and
characterized by a wedge element comprising a wedge and an abutment portion, the abutment portion configured for being directly or indirectly biased by the abutment end, the wedge configured and arranged for at least partial insertion between a portion of the armrest pole and at least a portion of the housing element in the locked position, further comprising a spring element positioned between the locking handle and the armrest pole, wherein the spring element is positioned between the wedge element and the armrest pole.

2. The locking device of claim 1, where the wedge element further comprises a flexible portion connecting the abutment portion and the wedge, for allowing the wedge to move relative to the abutment portion.

3. The locking device of claim 1, where the locking device further comprises a bushing arranged between the housing element and the armrest pole.

4. The locking device of claim 3, where the bushing comprises a tongue positioned between the wedge element and the armrest pole.

5. The locking device of claim 1, where the wedge element comprises a guiding element configured for movement in between the armrest pole and the housing element.

6. The locking device of claim 5, where the locking device further comprises a bushing arranged between the housing element and the armrest pole and where the guiding element is configured for interaction with a protrusion on the bushing.

7. The locking device of claim 1, wherein the wedge element comprises the spring element positioned between the locking handle and the armrest pole.

* * * * *